US006307502B1

(12) United States Patent
Marti-Canales et al.

(10) Patent No.: US 6,307,502 B1
(45) Date of Patent: Oct. 23, 2001

(54) RADIOMETRY SYSTEM WITH AN APERTURE SYNTHESIS TYPE ANTENNA AND ITS APPLICATION TO HYPER-FREQUENCY IMAGING

(75) Inventors: Javier Marti-Canales, Leiden; Manuel Martin-Neira, Oegstgeest, both of (NL); Per Olav Iversen, Garches (FR)

(73) Assignee: Agence Spatiale Europeene, Paris (FR)

( * ) Notice: Subject to any disclaimer, the term of this patent is extended or adjusted under 35 U.S.C. 154(b) by 0 days.

(21) Appl. No.: 09/473,948

(22) Filed: Dec. 29, 1999

(30) Foreign Application Priority Data

Dec. 30, 1998 (FR) .................................................. 98 16682

(51) Int. Cl.[7] ........................................................ G01S 3/02
(52) U.S. Cl. ............................................................ 342/351
(58) Field of Search .................................... 342/351, 361, 342/362, 363–366

(56) References Cited

U.S. PATENT DOCUMENTS

| 4,724,439 | * | 2/1988 | Wiley et al. | 342/351 |
| 4,864,308 | * | 9/1989 | Raab et al. | 342/351 |
| 5,016,018 | * | 5/1991 | Chang et al. | 342/351 |
| 5,053,781 | * | 10/1991 | Milman | 342/351 |
| 5,631,414 | * | 5/1997 | Cherny | 73/170.27 |
| 5,724,044 | * | 3/1998 | Tanaka | 342/351 |
| 5,999,121 | * | 12/1999 | Salonen | 342/351 |
| 6,057,799 | * | 5/2000 | Martin-Neira et al. | 342/351 |

OTHER PUBLICATIONS

M. Martin–Neira, et al., ESA Bulletin, No. 92, pp. 95–104, "MIRAS–A Two–Dimensional Aperture–Synthesis Radiometer for Soil–Moisture and Ocean–Salinity Observations", Nov. 1, 1997.

Ralph Pokuls, et al., IEEE Transactions on Antennas and Propagation, vol. 46, No. 9, pp. 1289–1296, "Dual–Frequency and Dual–Polarization Microstrip Antennas for SAR Applications", Sep. 1, 1998.

P. S. Hall, IEE Proceedings–H Microwaves, Antennas and Propagation, vol. 139, No. 5, pp. 465–471, "Dual Polarisation Antenna Arrays with Sequentially Rotated Feeding", Oct. 1, 1992.

(List continued on next page.)

Primary Examiner—Dao Phan
(74) Attorney, Agent, or Firm—Oblon, Spivak, McClelland, Maier & Neustadt, P.C.

(57) ABSTRACT

A radiometry system including an aperture synthesis antenna array type, including plural antenna elements, distributed in an antenna plane relative to at least one axis, according to a determined law. Each antenna element includes first and second coupling probes sensitive to hyper-frequency electromagnetic signals with dual linear polarization in quadrature (arbitrarily referred to as horizontal and vertical polarizations). The probes are connected two by two with electric receiving circuits to create a synthetic aperture. The horizontal ($f_{H1}$–$f_{H4}$) and vertical ($f_{V1}$–$f_{V4}$) coupling probes of successive antenna elements ($e_{A1}$–$e_{A4}$) are oriented in the antenna plane (At'), along each of the axes (Δ), such that at least one of the horizontal or vertical probes ($f_{H1}$–$f_{H4}$, $f_{V1}$–$f_4$) presents a 180° phase shift from one antenna element to the other ($e_{A1}$–$e_{A4}$), with the phase shift obtained by a sequential 90° rotation of those probes ($f_{H1}$–$f_{H4}$, $f_{V1}$–$f_{V4}$). Further, 180° phase shifts ($\Phi_{H2}$, $\Phi_{V3}$, $\Phi_{H4}$, $\Phi_{V4}$) are applied onto the outputs of the horizontal ($f_{H1}$–$f_{H4}$) and vertical ($f_{V1}$–$f_{V4}$) coupling probes, when one of the orientations of an antenna element ($e_{A1}$) is taken as the phase origin reference, in order to compensate for the 180° phase shifts with respect to the corresponding coupling probes ($f_{H1}$–$f_{V1}$) of the reference antenna element ($e_{A1}$).

9 Claims, 5 Drawing Sheets

OTHER PUBLICATIONS

B. Nauwelaers, et al., Journées Internationales De Nice Sur Les Antennes (JINA) 1990, pp. 459–462, "LA Rotation Sequentielle et la Polarisation Circulaire", Nov. 13–15, 1990.

M. Martin–Neira, et al., Proceedings of the International Geoscience and Remote Sensing Symposium (IGARSS), vol. 3, pp. 1323–1325, "MIRAS, A Two–Dimensional Aperture Synthesis Radiometer", Aug. 8–12, 1994.

M. Martin–Neira, et al., 1996 International Geoscience and Remote Sensing Symposium, vol. 2, pp. 869–871, "Integration of MIRAS Breadboard and Future Activities", May 27–31, 1996.

P. S. Hall, et al., Electronics Letters, vol. 25, No. 2, pp. 124–125, "Gain of Circularly Polarised Arrays Composed of Linearly Polarised Elements", Jan. 19, 1989.

* cited by examiner

RADIOMETRY SYSTEM WITH AN APERTURE SYNTHESIS TYPE ANTENNA AND ITS APPLICATION TO HYPER-FREQUENCY IMAGING

BACKGROUND

1. Field of the Invention

The present invention relates to a radiometry system comprising an aperture synthesis type antenna.

It further relates to the application of such a system for hyper-frequency imaging.

The invention more particularly relates to an antenna aboard a satellite and, more particularly, aboard a so-called "Low Earth orbit" or "LEO" satellite, for spatial observation of particular environmental parameters characterizing the earth globe, such as ocean salinity and soil moisture. Those observations and measurements are performed with the help of radiometers operating in hyper-frequency ranges.

2. Prior Art

The radiometers conventionally are equipped with antennas for measuring the radiation emitted by the observed earth globe area. Many antenna types as well as various operating techniques were proposed up to now for these antennas.

On of the major problem raised by antennas operating in the above mentioned frequency ranges is that an aperture of a very large size must be provided, which in particular also implies a large weight.

During the eighties, the use of uni-dimensional aperture synthesis antennas consequently was proposed. The aperture synthesis is made possible by providing a plurality of small-size antenna elements, arranged along a determined space configuration, which is equivalent to a single large-size element. A radiometer including such an antenna was used in the NASA "Electronically Scanned Thinned Array Radiometer" or "NASA ESTAR" project.

More recently, since the early nineties, the feasibility of bi-dimensional aperture synthesis antennas has been studied. As a non-limiting example, the applicant studied a prototype antenna of this type for a radiometer pilot project referenced as "MIRAS". The antenna also includes a plurality of small-size antenna elements. These antenna elements are arranged along the three coplanar branches of a "Y" shaped array. Each branch is 8.3 m long, and their spacing is equiangular, i.e. 120 degrees.

Each branch includes 133 regularly spaced antenna elements. The antenna elements are dual linearly polarized, in quadrature: according to arbitrarily called horizontal and vertical polarizations. Their beam width at half power is 70 degrees. The antenna plane is 31.2 degrees angled with respect to the nadir.

This radiometer is described in the article of M. Martin-Neira and J. M. Goutoule, "MIRAS—A Two-dimensional Aperture-Synthesis Radiometer for Soil-Moisture and Ocean-Salinity Observations", "ESA bulletin", November 1997, pages 95–104.

This radiometer is designed for collecting the flux radiated by the earth globe, by means of an antenna showing the above mentioned features.

To obtain the above mentioned aperture synthesis, a bi-dimensional interferometry is implemented.

In general, the basic measurement performed by an aperture synthesis radiometer consists of measuring a so-called "visibility function". This terminology originally derives from the optical interferometry theory and may be better understood by considering a Young interferometer for which each source generates an output interferogram, which alternately shows maxima and minima. The visibility factor of a sine-wave interferogram is defined as the ratio between the difference and the sum of the maximal and minimal amplitudes. This visibility factor may be defined as equal to the complex coherence degree, which constitutes the primary quantity measured in aperture synthesis.

Although the optic theory cannot, without an adaptation, be transposed from the purely optical field to the hyper-frequency range measurement field, for earth globe surface observation, in particular from the "LEO" satellites, a visibility function can also be defined here. The complex correlation (at zero delay) between each possible pair of antenna elements in the interferometry array gives a visibility function point, at a spatial frequency defined by a particular antenna element base line. Ideally, the visibility function consists of the Fourier transform of the brightness of the observed scene, weighted by the antenna element gain diagram, which can be retrieved from an inverse Fourier transform.

In the case of the "MIRAS" radiometer, those operations are performed by connecting each possible antenna element pair with a receiver of the type described in the "block-diagram" of FIG. 1, appended to the present description. The electronic portion is provided in "Monolithic Microwave Integrated Circuit", or "MMIC" technology. The frequency band retained is the "L" band centered on $\lambda=21$ cm.

The output voltage signals of two antenna elements $VA_i$ and $VA_j$ are represented, with both arbitrary indexes i and j being higher than or equal to 1 and lower than or equal to the maximum number of antenna elements.

The $VA_i$ and $VA_j$ signals are preprocessed through an amplifier (not shown). More precisely, each polarization component, H and V, is separately processed, and both components are sequentially transmitted, by means of an also not represented switch. The signals are split along two paths. A first path carries signals, which are directly transmitted to a first frequency converter stage, more precisely a frequency down converter, $FI_1$. The second path includes a 90 degrees phase shifter, so as to obtain signals in quadrature with the first-path signals. The phase-shifted signals are transmitted to a second frequency converter stage $FI_2$.

An oscillator OSC generating signals at a 1396 MHZ frequency is provided in order to obtain the frequency conversion. Both signal series are then submitted to a one-bit digitalization, in the $AN_1$ and $AN_2$ converters, so as to obtain signals representing the sign of those signals. The output signals are designated as $Sign(I_i)$ and $Sign(Q_i)$ wherein I and Q represent the phase and quadrature signals, respectively.

This output signal pair then is forwarded to first is inputs of a one bit digital correlator $Co_i$. The latter receives on a second input a signal $Sign(I_j)$ representing the sign of the (non phase-shifted) output signal $V_j$ of the j-indexed antenna element. More precisely, the correlator $Co_i$ comprises two digital multipliers $Mp_1$ and $MP_2$, the outputs of which respectively are connected to the integrators $It_1$ and $It_2$. The multiplier $Mp_1$ receives both signals $Sign(I_i)$ and $Sign(I_j)$ and the multiplier $Mp_2$ receives both signals $Sign(Q_i)$ and $Sign(I_j)$.

In the case of the described example, 8,778 correlators are needed to process all antenna element pairs. Taking into account the frequency down conversion, the data flow speed at the correlator output is low.

To summarize, each correlator performs a complex multiplication followed by an integration of a pair of received signals, wherein each pair corresponds to a base line. The result of each elementary operation allows calculating one of the visibility function points.

When resorting to conventional antennas, using the "L" band which is advantageous for the above mentioned applications leads to very large antenna apertures, of the order of 20 m. For a particular actual antenna area (total area of the element), resorting to the aperture synthesis technology results in an equivalent antenna with a much larger area. This result is the same as if the antenna would include a large number of virtual antenna elements.

In the case of the "MIRAS" radiometer for instance, the antenna elements of each branch of the "Y" are distributed on a single, 8.3 m long, element line. However, the calculations and experiments show that this antenna is equivalent to a six-branch star shaped array, inscribed within a circle with a diameter larger than the length of the "Y" branches. This result is illustrated in FIG. 5 of the above-mentioned article, which the reader could refer to for further details.

The aperture synthesis antenna technology consequently is highly interesting since it allows strongly reducing both the space requirements and the weight. It also offers clear advantages with respect to other antenna embodiments, such as the mechanical scanning mode by rotation around an axis of the support satellite.

This however, as indicated, implies antennas with dual linearly polarized elements in quadrature. Since measuring the visibility function, in the case of aperture synthesis antennas, implies considering all combinations of possible antenna element pairs, two components have to be taken into account: the crossed polarization and the parallel polarization. On the other hand, when considering the global radiometric system, the calculation and experiments show that one of the penalizing paramaters is the ratio between the level of the crossed polarization component and the level of the parallel polarization component. There consequently is a need to improve the inverse ratio, i.e. the ratio between the level of the parallel polarization component and the level of the crossed polarization component.

The aim of the invention is to improve this ratio.

SUMMARY OF THE INVENTION

For this purpose, a 180 degrees phase shift is introduced between the elements of an aperture synthesis antenna. Since the antenna elements substantially are planar, this phase shift is obtained by a sequential 90 degrees rotation, of the antenna elements with respect to one another, according to any arbitrary sequence.

This arrangement substantially allows eliminating the crossed polarization components.

Besides improving the above mentioned ratio, this arrangement also offers further advantages which are reflected both in the performance of the radiometry system proper, i.e. in its globality, and in the antenna element design. This design in particular allows extending the frequency band used, which in turn exerts a decisive impact on the manufacturing tolerances and consequently allows a more repetitive process.

The object of the invention consequently is a radiometry system comprising an array antenna of the aperture synthesis type, wherein said antenna consists of a plurality of antenna elements, distributed in a so-called antenna plane according to a determined law, along at least one axis, wherein each of said antenna elements comprises a first and a second coupling probes sensitive to hyper-frequency electromagnetic signals with a dual linear polarization in quadrature, with arbitrarily called horizontal and vertical polarizations, and wherein said probes are connected two by two with electric receiving circuits so as to create said synthetic aperture, characterized in that said horizontal and vertical coupling probes of successive antenna elements are oriented in said antenna plane, along each of said axes, in such a manner that at least one of said horizontal or vertical probes presents a 180 degrees phase shift from one antenna element to the other, with said phase shift being obtained by a sequential 90 degrees rotation of those probes, and in that means are provided to apply 180 degrees phase shifts onto the outputs of said horizontal and vertical coupling probes, when one of said orientations of an antenna element is taken as the phase origin reference, in order to compensate for said 180 degrees phase shifts with respect to the corresponding coupling probes of said reference antenna element.

Another object of the invention is the application of such a radiometry system for observing the earth globe surface in hyper-frequency imaging.

BRIEF DESCRIPTION OF THE DRAWINGS

The invention will be better understood and further features and advantages will appear upon reading the following description while referring to the appended drawings wherein.

DETAILED DESCRIPTION

As indicated above, each antenna element in the aperture synthesis array is dual polarized in quadrature.

Figure 1:
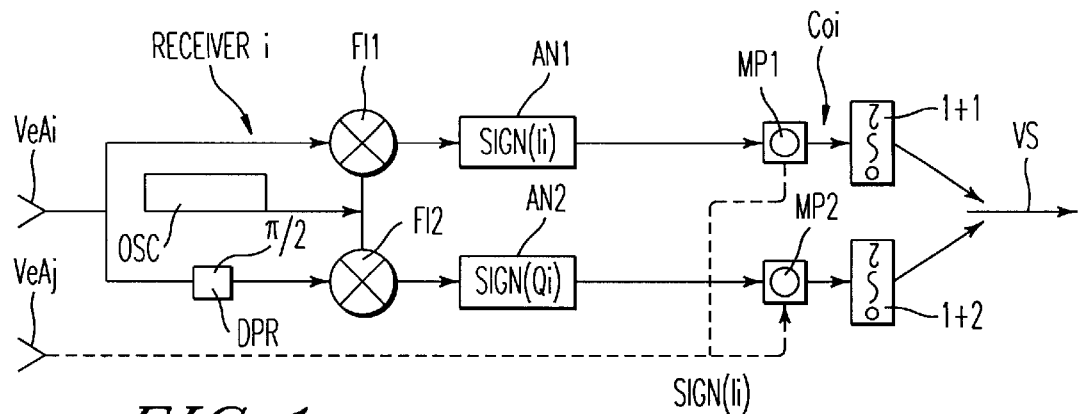
FIG. 1 schematically illustrates a prior art exemplary block diagram of an elementary receiver for receiving the output signal of a pair of aperture synthesis antenna elements.
Figure 2:
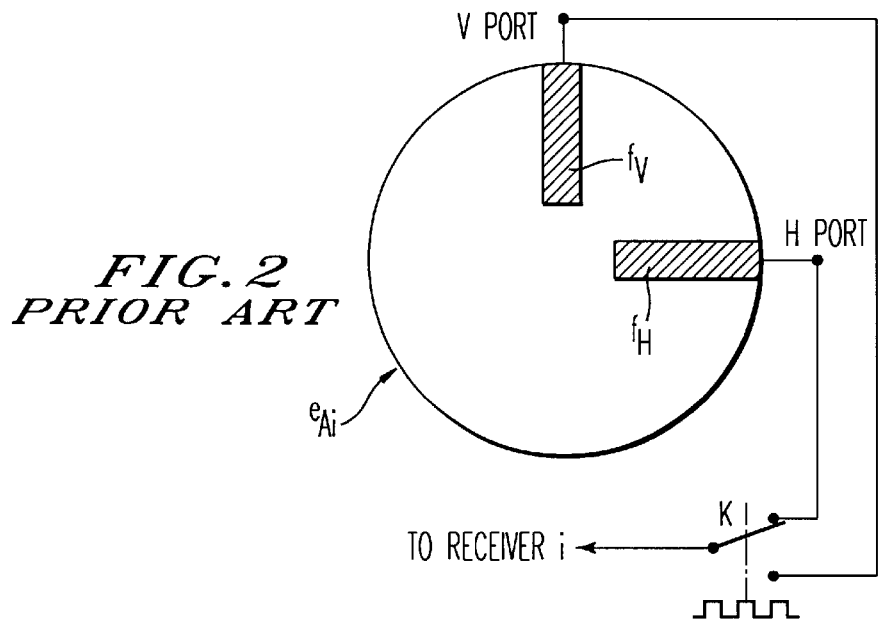
FIG. 2 illustrates one of the elements of an exemplary conventional aperture synthesis antenna.

FIG. 2 schematically illustrates an exemplary embodiment of an element $e_{Ai}$ (with an arbitrary index i) of a conventional aperture synthesis array antenna. This element, in the described example, is shaped as a circular aperture in a low-thickness substrate comprising two coupling probes, $f_V$ and $f_H$, constituting the active elements, sensitive to the sensed radiation, for the vertical and horizontal polarization components, respectively. These coupling probes, often simply designated as "probes", respectively are connected with ports, namely a vertical or "V port", and a horizontal or "H port". The output signals of these ports are transmitted to receiving circuits (of rank i), for instance of the type described with reference to FIG. 1, via an electronic switch K in view of a sequential processing of these two components H and V.

An aperture synthesis antenna substantially is planar and consists of a plurality of such elements, arranged as an uni-dimensional or bi-dimensional array and for instance, according to a particular configuration, so as to form a Y shaped array for the above mentioned "MIRAS" radiometer. The elements $e_{Ai}$ may be equally distributed in the antenna plane, or the distribution may, on the contrary, conform to a particular, such as exponential, law. Besides the element number and the array antenna configuration, various other parameters characterize this array, in particular the sizes and shapes of the antenna elements, the fill factor and the average distance between the elements.

An aperture synthesis antenna of the invention keeps the general configuration of a prior art antenna.

Figure 3:
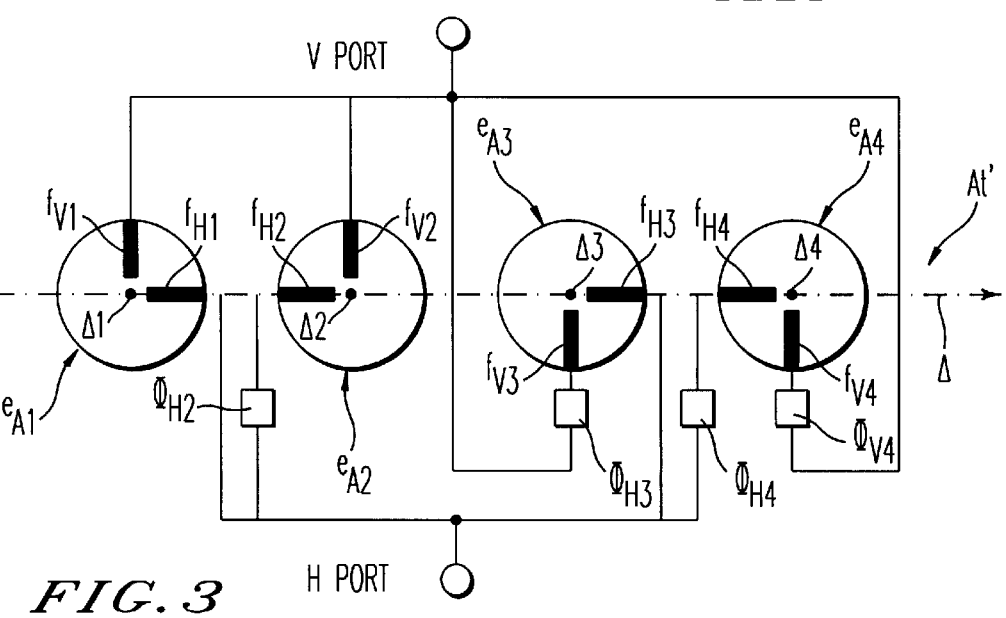
FIG. 3 illustrates a first exemplary aperture synthesis antenna of the invention, in an uni-dimensional configuration.

FIG. 3 illustrates a first exemplary embodiment of an antenna At' of the invention. It implements antenna elements, which per se are conventional, of the type described while referring to FIG. 2 for instance.

In the example illustrated in FIG. 3, the antenna At' is an aperture synthesis antenna comprising four identical elements, linearly arranged along the axis $\Delta$. These elements are referenced $e_{A1}$ to $e_{A4}$. These elements, like previously, are dual linearly polarized in quadrature. For this purpose, each of them includes a pair of horizontal, $f_{H1}$ to $f_{H4}$, and vertical, $f_{V1}$ to $f_{V4}$, coupling probes. Finally, the outputs are connected with ports, namely the vertical or V port and the horizontal or H port.

The antenna At' however shows two specific important features of the invention.

The first feature consists of a sequential 90 degrees rotation of the antenna elements, $e_{A1}$ to $e_{A4}$, more precisely of the corresponding coupling probes, with respect to one another. Since the antenna elements $e_{A1}$ to $e_{A4}$ supposedly are circular, the rotation is performed around four axes $\Delta_1$ through $\Delta_4$, which are orthogonal to the plane of the antenna At' and cross it at the respective phase centers of these elements.

Since the coupling probes are arranged at 90 degrees and since the antenna elements are coplanar and each of them includes two coupling probes, there are four, and only four, arrangement possibilities for these antenna elements in space.

In the described example, the element $e_{A1}$ is arranged in such a way that the vertical coupling probe $f_{V1}$ is in the upper half plane and the horizontal coupling probe $f_{H1}$ is in the right-hand halt plane (with respect to FIG. 3). The element $e_{A2}$ is arranged in such a way that the vertical coupling probe $f_{V2}$ is in the upper halt plane and the horizontal coupling probe $f_{H2}$ is in the left-hand plane. The element $e_{A3}$ is arranged in such a way that the vertical coupling probe $f_{V3}$ is in the lower halt plane and the horizontal coupling probe $f_{H3}$ is in the right-hand plane. The element $e_{A4}$ is arranged in such a way that the vertical coupling probe $f_{V4}$ is in the lower halt plane and the horizontal coupling probe $f_{H4}$ is in the left-hand plane.

According to an important second feature, the active elements, i.e. the coupling probes, whether horizontal or vertical, are connected to their respective, H or V, ports either directly or via a 180 degrees phase shifter.

One of the four antenna elements, the element $e_{A1}$ for instance, is taken as the basic element, i.e. as the reference for the phases of the signals sensed by the antenna At'. The configuration of the element $e_{A2}$ is a "mirror" configuration of the element $e_{A1}$, with respect to a vertical axis. Since the H port performs a sum of the horizontal polarization components of all elements, the output signals of the active element $f_{H2}$ need to be 180 degrees phase shifted so as to be in phase with those originating from the element $e_{A1}$. For this purpose, a phase shifting circuit $\Phi_{H2}$ is interposed between the coupling probe $f_{H2}$ and the horizontal H port.

Similarly, the configuration of the element $e_{A3}$ is a mirror of the configuration of the element $e_{A1}$, with respect to a horizontal axis. A phase shifting circuit ($\Phi_{V3}$ is interposed between the coupling probe $f_{V3}$ and the vertical V port.

Finally, the element ear is a mirror configuration of the element $e_{A1}$ with respect to a 45 degrees angled axis. A phase shifting circuit $\Phi_{H4}$ is interposed between the coupling probe $f_{H4}$ and the horizontal H port and a phase shifting circuit $\Phi_{V4}$ is interposed between the coupling probe $f_{V4}$ and the vertical V port.

Due to these two arrangements, the parallel-polarized components are added in phase, whereas the crossed polarized components are added in antiphase. The ascertained improvement is in the order of 30 dB, as well be shown further below in a more detailed manner, when describing a second embodiment.

Experiments furthermore show that the relative position of the antenna elements $e_{A1}$ to $e_{A4}$ is not determining. In other words, as an example, the configuration could just as well be $e_{A2}$, $e_{A1}$, $e_{A4}$ and $e_{A3}$, along the axis $\Delta$ and still bring the same result, In reality, an aperture synthesis antenna includes a much larger number of antenna elements than shown on the antenna At' of FIG. 3, since this reduced configuration only was described to illustrate the essential features of the invention.

The invention furthermore is not limited to providing uni-dimensional aperture synthesis antennas, and another example will now be described for a bi-dimensional aperture synthesis antenna, with reference to FIGS. 4A and 4B. The general configuration of this antenna is similar to the above quoted "MIRAS" radiometer. This, more precisely, is the configuration of an experimental model produced by the applicant, which configuration may be called a "reduced configuration", since the antenna At" only includes a reduced number of antenna elements.

Figure 4A:
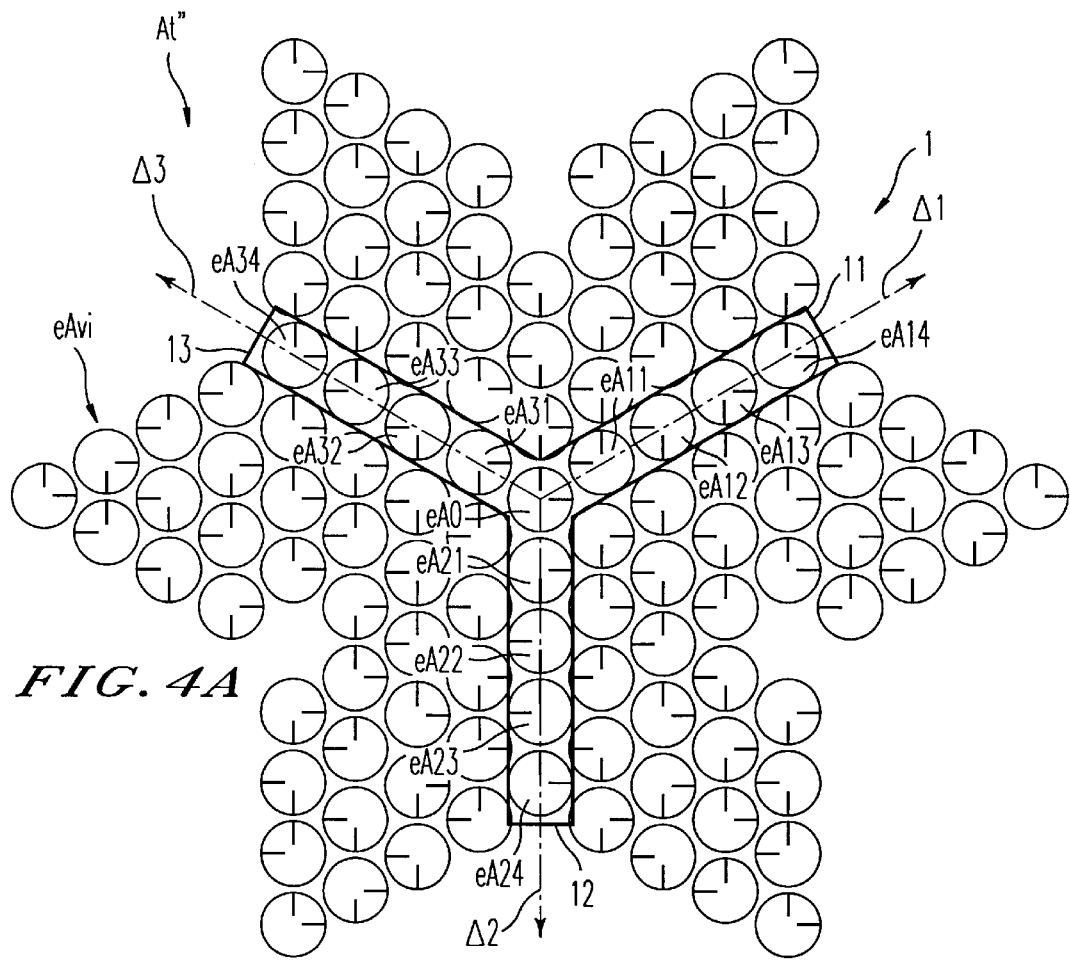
FIGS. 4A and 4B illustrate a second exemplary aperture synthesis antenna of the invention in a bi-dimensional configuration, and its visibility function, respectively.

FIG. 4A illustrates the antenna At" as seen from above. The antenna material structure comprises a "Y" shaped support 1 and the antenna elements are arranged on the arms of said support. Each arm, 11 to 13, bears four regularly spaced antenna elements $eA_{11}$–$eA_{14}$, $eA_{21}$–$eA_{24}$ and $eA_{31}$–$eA_{34}$, respectively. These elements are aligned along three axes $\Delta_1$ to $\Delta_3$, respectively, with an equiangular spacing, i.e. 120 degrees, from one another. A thirteenth element is located at the center of the "Y", where all three axes $\Delta_1$ to $\Delta_3$ intersect.

The antenna elements are dual linearly polarized in quadrature. To simplify the drawing, not all coupling probes of each element were individually referenced. The FIG. 4B does not represent, either the H and V ports, or the electronic (receiving) signal processing circuits for the signals originating from all antenna elements pairs to retrieve the visibility function points.

Both the experiments and the calculations show that the "MIRAS" radiometer type antenna configuration, however reduced, is equivalent to an identical phase array of a physical antenna.

Figure 4B:
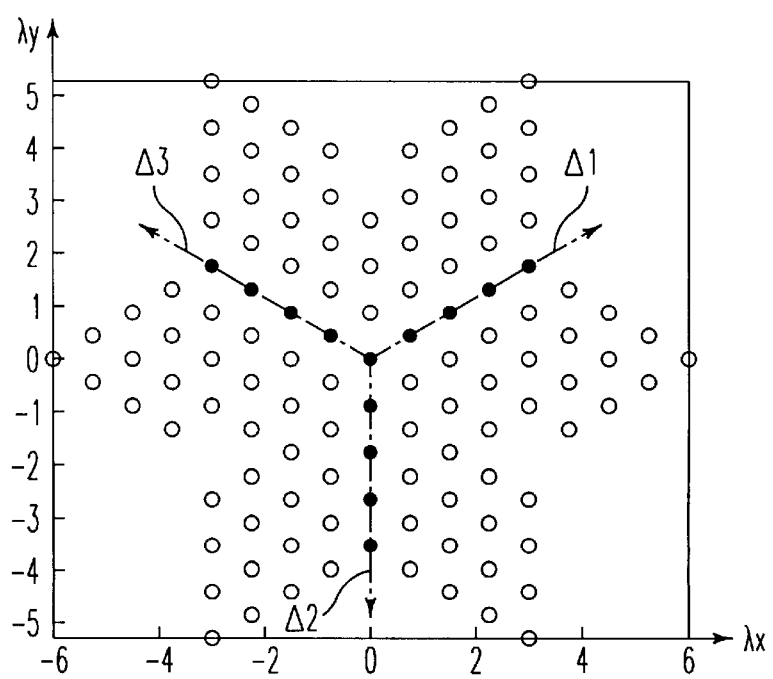

The visibility function is shown on the graph of FIG. 4B, with respect to two orthogonal axes, $\lambda_Y$ and $\lambda_X$. The zero value arbitrarily is fixed at the center of the "Y", and consequently also of the star. In this figure, the axis $\Delta_2$ is directed downwards and parallel to the vertical axis of the $\Delta_Y$ referential system.

As previously, a sequential 90 degrees rotation from one antenna element to the next is provided along each of the axes $\Delta_1$ to $\Delta_3$, according to the main feature of the invention. The rotation order may be arbitrary.

Although the 180 degrees phase shift was not represented and the coupling probes were not referenced, in order to simplify the drawing, it should be clear that appropriate phase shifts are provided, as described given with reference to FIG. 3. Those phase shifts are obtained with the help of on board data processing means, with a recorded program. Naturally, only the thirteen central actual antenna elements, $eA_{11}$ to $eA_{34}$ and $eA_0$, which are the only physically existing elements, are concerned with this second important feature of the invention.

The main features of an aperture synthesis antenna and its operating mode will now be detailed. The radiometric system and its antenna, for instance the previously considered At" antenna, are considered further below as aboard the above mentioned "LEO" type satellite rotating around the earth globe GT.

The half space of directions centered on the bore sight of the radiometer, i.e. of the antenna At", essentially is filled by the earth globe GT disk, with the rest consisting of the so-called cold heaven. The earth globe GT behaves as a so-called thermally gray body and the cold heaven as a black body, at the temperature of 2.7° K. The spectral brightness coming from the earth depends upon the frequency sensed by the antenna and upon the features both of the atmosphere and the soil, at the observed location, i.e. the scene element SO.

As for conventional radiometers, the bandwidth measured by an aperture synthesis radiometer generally is low, of the order of a few percent of the bandwidth of the emitted frequencies. The scene spectrum consequently is much larger than the radiometer pass-range, and the spectral brightness of the scene may be considered as constant within the range of the measured frequencies. To establish a particular value of the spectral brightness within the radiometer pass-band, the central frequency value, i.e. $f_0=c/\lambda_0$ may be considered.

Other assertions can be formulated. For the spatial correlation, the thermal source point emission is incoherent, which means that the complex coherence factor is a spatial delta function, The mutual coherence function of the scene is determined as the product of the auto-coherence function and the complex coherence factor.

Both orthogonal components of the polarization of the electric field supposedly are an ergodic stochastic process, abiding by statistics of the circular complex gaussian type. The radiometer will perform an aperture synthesis on each polarization component, independently from one another. Each component consequently may be separately considered. The energy of the radiation diagram rear lobes furthermore supposedly is so low that the radiometer only is sensitive to radiations coming from the front half space.

Starting from these admitted considerations and approximations, and taking into account the retained conventions for the referential systems, it can be shown that the spectral brightness of each element of the observed scene is given by the following relation:

$$B^{SP}(f; \phi', \theta') = e(f_0; \phi', \theta') \frac{B_{bb}^{SP}(f_0)[1 + sgn(f)]}{2}, \quad (1)$$

a relation where $e(f_0, \phi', \theta')$ is the spectral emissivity and $$B_{bb}^{SP}(f_0)$$

is the spatial blackbody brightness for a physical temperature $T_{ph}$, and both of these parameters are assessed at the central pass-band frequency $f_0$ of the radiometer. The equation (1) can be written:

$$B^{SP}(f; \phi'; \theta') = \frac{k_B T_{ph} e(\phi', \theta')}{\lambda_0^2}[1 + sgn(f)], \quad (2)$$

where $k_B$ is the Boltzman constant. The emissivity is assessed at the central frequency $f_0$.

Starting from this equation, the voltage induced in the antenna by the radiated energy can be calculated.

Considering now the antenna element located in the element array center (point $\Sigma$), the radiation of a surface element of the scene SO induces an elementary voltage which, when the antenna element output is closed on an adapted load, is proportional to the electric field. This elementary voltage is given by the following equation:

$$dv(t) = \sqrt{\frac{\lambda_0^2}{4\pi} G_0} |F_n(\phi, \theta)| de[t - \tau(\phi, \theta); \phi', \theta'], \quad (3)$$

where $G_0$ is the antenna element directivity, $F_n(\phi, \theta)$ is the standardized voltage radiation diagram, and $\tau(\phi, \theta)$ is the delay associated with the element. All of these parameters refer to one (either vertical or horizontal) of the two polarization components of the electric field.

The direction defined by $(\phi', \theta')$ and by $(\phi, \theta)$ is the same. Furthermore, $r=r'$. Finally, the largest size of the antenna At can be considered as much smaller than either r or r'. There follows that what is valid for the central antenna element also is valid for all other elements, as far as the directions and ranges defined in the referential system $\Sigma XYZ$ are concerned.

Finally, the total voltage resulting from the entire observed scene is equal to the sum of the elementary voltages induced by all elements of the scene;

$$v(t) = \int_{tous\, dv} dv(t) = \sqrt{\frac{\lambda_0^2}{4\pi} G_0} \int_{tous\, dv} |F_n(\phi, \theta)| de[t - \tau(\phi, \theta); \phi, \theta] \quad (4)$$

As recalled above, an aperture synthesis antenna is composed of a plurality of antenna elements. The antenna elements will now be combined two by two. The arbitrary indexes i and j are attributed to the elements of each considered pair, with i and j being greater than or equal to 1 and smaller than or equal to a maximum element number, where each antenna element pair, i, j defines a base line.

The two following coordinate parameters: $\xi=\sin\theta\cos\phi$ and $\eta=\sin\theta\sin\phi$, will now be defined, with $-\xi$ representing the coordinate perpendicular to the orbit and $\eta$ the coordinate parallel to the orbit.

The crossed correlation between the output voltages of both antenna elements i and j abides by the equation;

$$\Gamma_{s_i s_j}(0) = \frac{k_B}{8\pi} \tilde{R}_{ij}(0) \sqrt{G_{0,i} G_{0,j}} \quad (5)$$

-continued $$\int\int_{\xi^2+\eta^2\leq 1} F_i(\xi,\eta)F_j^*(\xi,\eta)\frac{T_B(\xi,\eta)}{\sqrt{1-\xi^2-\eta^2}}e^{-j2\pi(u\xi+v\eta)}\,d\xi d\eta,$$

where $T_B(\xi,\eta)$ is the brightness temperature such that $T_B(\xi,\eta)=T_{ph}(\xi,\eta)e(\xi,\eta)$, u and v are the base line components along the X and Y axes of the $\Sigma$XYZ referential system (with $u\equiv(x_j-x_i)/\lambda_0$ and $v\equiv(y_j-y_i)/\lambda_0$) and $F_i(\xi,\eta)$ is the diagram for the voltage of one antenna element, standardized with respect to its maximal value $$\sqrt{G_{0,i}}\,.$$

If a source point (delta function) along a particular direction $(\lambda_0, \eta_0)$ is considered as a brightness temperature distribution, the following equations are obtained:

$$\Gamma s_i s_j(0) = \frac{k_B}{8\pi}\tilde{R}_{ij}(0)\sqrt{G_{0,i}G_{0,j}} \quad (6)$$

$$F_i(\xi_0,\eta_0)F_j^*(\xi_0,\eta_0)\frac{T_B(\xi,\eta)}{\sqrt{1-\xi_0^2-\eta_0^2}}e^{-j2\pi(u\xi_0+v\eta_0)},$$

The estimated brightness temperature (pulse response) is obtained by the inverse Fourier transform, by using all base lines. Different weighting factors can be attributed to each base line, in particular to improve the beam efficiency. Experiments have shown that one particular factor set allows assimilating the antenna to a phase array.

By using the redundant number as a weighting function, the following equation is obtained:

$$T_B(\xi,\eta) = \frac{k_B}{8\pi}\tilde{R}_{ij}(0)\frac{T_B(\xi_0,\eta_0)}{\sqrt{1-\xi_0^2-\eta_0^2}} \quad (7)$$

$$\frac{1}{N^2}\sqrt{G_{0,i}G_{0,j}}\sum_{tous(i,j)} F_i(\xi_0,\eta_0)F_j^*(\xi_0,\eta_0)e^{-j2\pi[u(\xi-\xi_0)+v(\eta-\eta_0)]},$$

an equation where N is equal to the array element number.

The pulse response of the antenna At" along one direction $(\xi_0, \eta_0)$ is the same as the response of a physical array wherein all antenna elements aim (i.e. are in phase) into the same direction $(\xi_0, \eta_0)$.

As already reminded, the above-mentioned "MIRAS" radiometer measures both vertical and horizontal polarization components in a sequential manner, with the help of an electronic switch K (FIG. 2). The analytical voltage of an open circuit, at the output of the H polarization of the switch K of an arbitrary rank i, is given by the following equation:

$$v_i'^H(t) = v_i^H(t) + a_i v_i^V(t), \quad (8)$$

wherein $A_{eff}$ represents the effective area of a single element, $x_n$ and $y_n$ represent its position on the array, and (u,v) are its projected spherical coordinates in the remote field. The equation (10) may be expressed in terms of power, as shown by the following equation:

$$S_T(u,v) = V_T(u,v)\cdot\frac{V_T^*(u,v)}{Z_0} = \frac{A_{eff}}{Z_0 N^2}\left[\sum_{n=1}^N |V_n|^2 + \right. \quad (11)$$

$$\left. \sum_{p\neq q} V_p(u,v)V_q^*(u,v)e^{j2\pi[(x_p-x_q)(u-u_0)+(y_p-y_q)(v-v_0)]}\right]$$

The equation (11) directly is comparable with the equation (7), by substituting (u, v) to (x, y) and $(\xi, \eta)$ to (u, v), with the exception of a constant and an offset value. This correspondence does show the equivalence of the antenna with a phase array. The different beam directions $(\xi_0, \eta_0)$ are obtained by means of a conformation array of an additional beam.

Let us now refer to the At" antenna configuration of FIG. 4A.

To materialize the example, the diameter of the antenna elements is 103 mm, the separation between elements is 0,89 $\lambda$ (with $\lambda$=21 cm at the central frequency), and the fill factor for the described reduced, 13-elements configuration is 0,21.

Simulations were performed, with and without rotating the antenna elements. They confirm the theoretical results which can be derived from the above mentioned equations.

Figure 5:
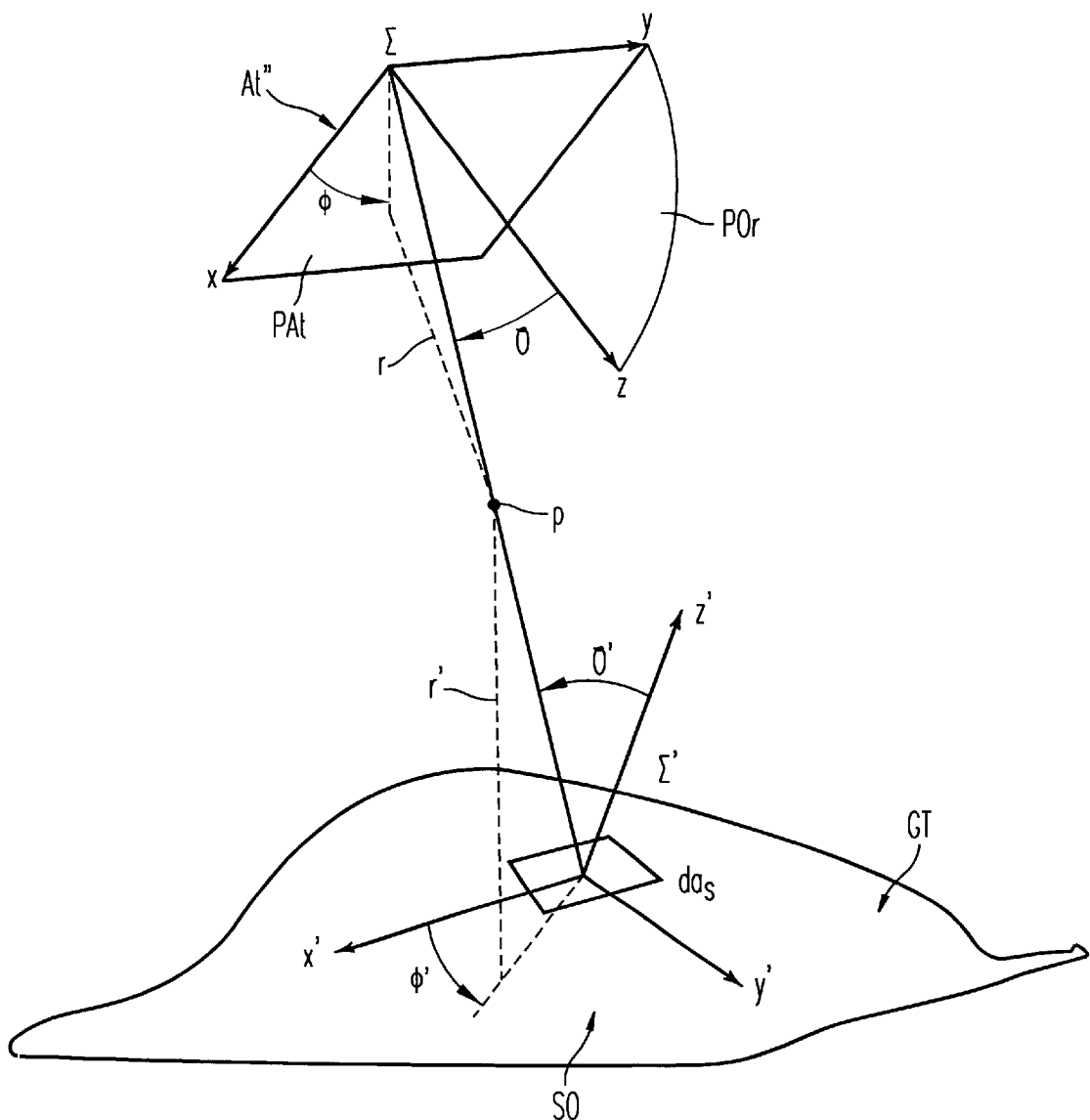
FIG. 5 is an explanatory diagram of the interrelations between two referential systems connected with an board antenna aboard a satellite and with an observed earth globe zone, respectively.
Figure 6A:
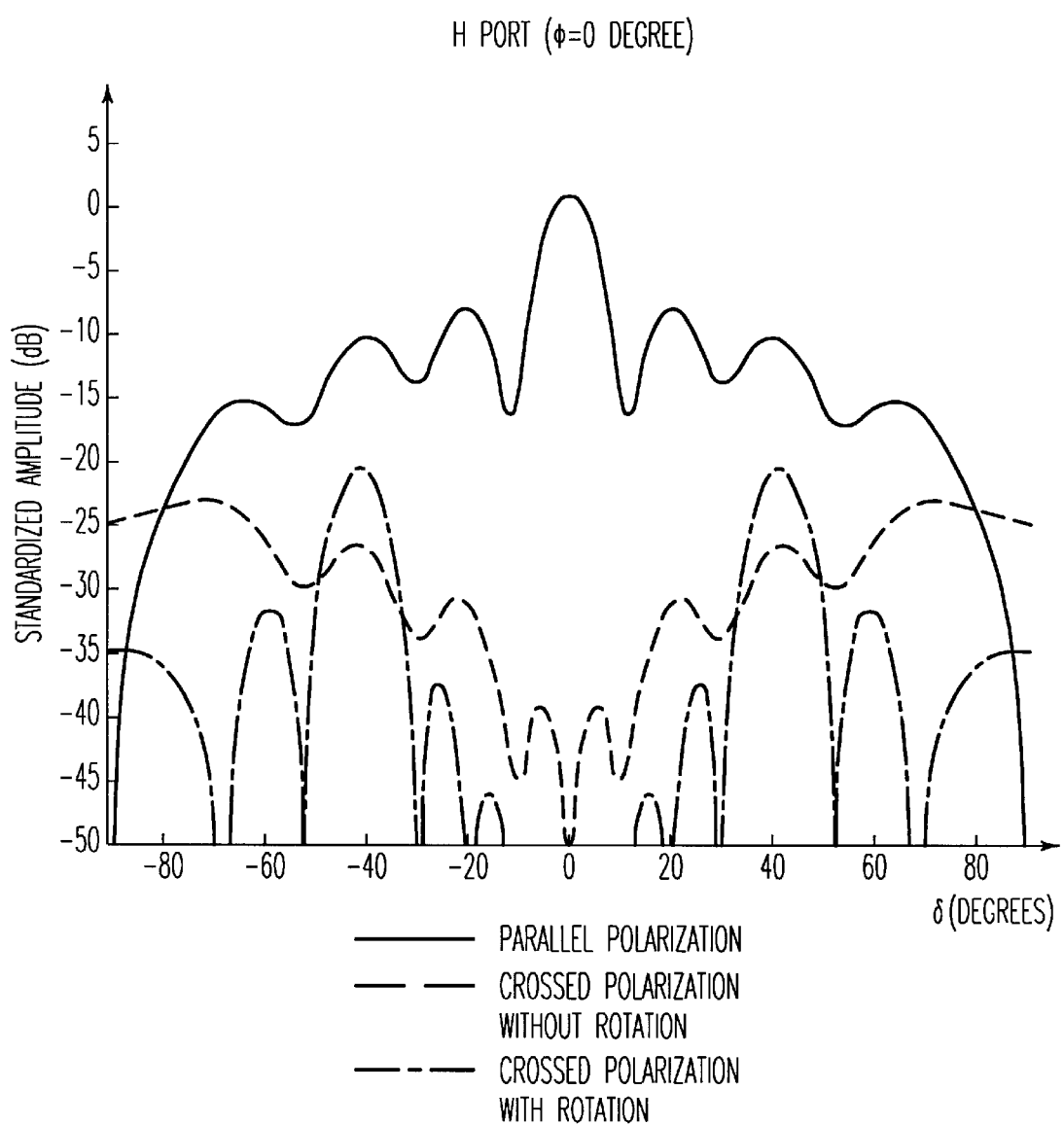
FIGS. 6A and 6B are graphs illustrating the antenna radiation diagram features, with and without the arrangements of the invention.

As a non limiting example, the diagram of FIG. 6A illustrates the standardized amplitude (in dB) of the radiation diagram for the antenna illustrated in FIG. 4A, for the H port, as a function of θ, (on both sides of the bore sight Z: FIG. 5) namely for $\Phi$=0 degrees (see FIG. 5).

On this FIG. 6A, the gain curve for the parallel polarization component is drawn as a full line, the gain curve for the crossed polarization component, without element antenna rotation, is drawn as a dashed line, and the gain curve for the crossed polarization component with antenna element rotation is drawn as a dot-and-dash line.

When a sequential rotation of the antenna elements according to the invention is applied, a very large attenuation of the crossed-polarization component amplitude is ascertained, in particular for regions close to the bore sight. The amplitude of the crossed polarization component practically is negligible for angles within ±15 degrees around the bore sight. The amplitude remains low (lower than −35 dB), for angles within ±30 degrees.

Figure 6B:
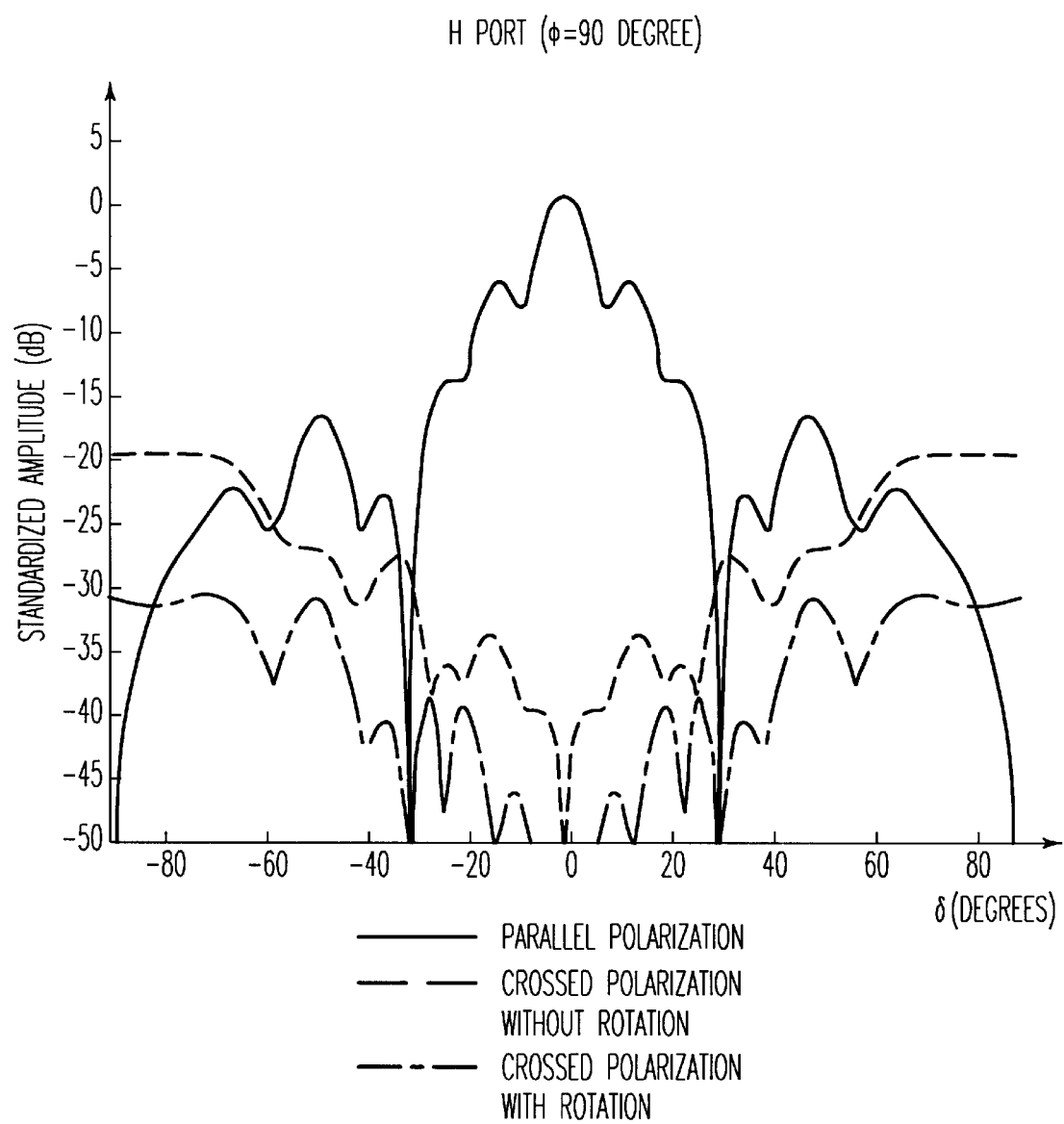

The diagram of FIG. 6B illustrates the standardized amplitude (in dB) of the radiation diagram under the same conditions, with the exception however that the angle $\Phi$ is equal to 90 degrees.

Here also the crossed-polarization component amplitude is a very strongly reduced for angles within ±15 degrees around the boresight. The amplitude remains low (lower than −40 dB) for angles within ±25 degrees and always is lower than the amplitude obtained for a configuration without rotation.

The performed simulations showed that it also is possible to obtain excellent results with other boresight configurations of the antenna At". The same is true for the V port.

Upon reading the above, it clearly is ascertainable that the invention does reach its objects.

It however should be clear that the invention is not limited to the only embodiments explicitly described above, in particular in relation with FIGS. 3 to 6B.

As previously indicated, the invention is perfectly compatible with both uni-dimensional and bi-dimensional aperture synthesis antennas. In this latter case, the possible configurations are not limited to the one described here, namely an antenna wherein the antenna elements are equally distributed on the three branches of a "Y", even if the obtained results with the latter configuration are particularly interesting. Many other configurations, in particular of a "T" or a "U" type, are perfectly adapted to a radiometry system aboard a satellite.

The antenna elements are not necessarily equally distributed in the antenna plane, but may, on the contrary be distributed on the basis of a particular law, such as an exponential law, etc.

Finally, the 180 degrees phase shifts were obtained by resorting to on board data processing means, with a recorded program. The phase shifts are real time performed during the crossed correlation steps.

Although the invention is particularly adapted to soil moisture and ocean salinity measurements, it clearly could not be limited to this sole application type. It applies in each case where a radiation emitted within one or several hyper-frequency ranges by a scene to be observed should be sensed, in view of measuring a particular parameter by means of this radiation.

What is claimed is:

1. A radiometry system comprising an antenna array of the aperture synthesis type having a plurality of antenna elements, distributed in an antenna plane relative to at least one axis, according to a determined law, each of said antenna elements comprising first and second coupling probes sensitive to hyper-frequency electromagnetic signals with dual linear horizontal and vertical polarizations, in quadrature, said probes being connected two by two with electric receiving circuits so as to create said synthetic aperture, wherein said horizontal ($f_{H1}$–$f_4$) and vertical ($f_{V1}$–$f_{V4}$) coupling probes of successive antenna elements ($e_{A1}$–$e_{A4}$) are oriented in said antenna plane (At'), along each of said axes ($\Delta$), in such a manner that at least one of said horizontal or vertical probes ($f_{H1}$–$f_{H4}$, $f_{V1}$–$f_{V4}$) presents a 180 degrees phase shift from one antenna element to the other ($e_{A1}$–$e_{A4}$), with said phase shift being obtained by a sequential 90 degrees rotation of those probes ($f_{H1}$–$f_{H4}$, $f_{V1}$–$f_{V4}$), and wherein means are provided to apply 180 degrees phase shifts ($\Phi_{H2}$, $\Phi_{V3}$, $\Phi_{H4}$, $\Phi_{V4}$) onto the outputs of said horizontal ($f_{H1}$–$f_{H4}$) and vertical ($f_{V1}$–$f_{V4}$) coupling probes, when one of said orientations of an antenna element ($e_{A1}$) is taken as the phase origin reference, in order to compensate for said 180 degrees phase shifts with respect to the corresponding coupling probes ($f_{H1}$–$f_{V1}$) of said reference antenna element ($e_{A1}$).

2. A radiometry system according to claim 1, wherein said antenna elements ($e_{A1}$–$e_{A4}$) are aligned on a single axis ($\Delta$), so as to form an array antenna with a uni-dimensional aperture synthesis (At').

3. A radiometry system according to claim 1, wherein said antenna elements ($e_{A0}$, $e_{A11}$–$e_{A34}$) are aligned on at least two axis ($\Delta_1$–$\Delta_3$) so as to form an array antenna with a bi-dimensional aperture synthesis (At") and said sequential rotation is performed along each of said axes ($\Delta_1$–$\Delta_3$.

4. A radiometry system according to claim 3, wherein said antenna elements ($e_{A11}$–$e_{A34}$) are distributed into three subsets each of which is arranged on a support arm (11–13), with such arms being aligned on three axes, with equiangular spacing (i.e. 120 degrees), and an additional antenna element ($e_{A0}$) is arranged at the intersection of said three axes ($\Delta_1$–$\Delta_3$), said antenna being of "Y" shape thereby.

5. A radiometry system according to claim 2 or 3, wherein said antenna elements ($e_{A0}$, $e_{A11}$–$e_{A34}$) are equally distributed along said axes ($\Delta_1$–$\Delta_3$).

6. A radiometry system according to claim 4, wherein said antenna elements are equally distributed along said axes ($\Delta_1$–$\Delta_3$).

7. A radiometry system according to claim 1, as used for hyper-frequency imaging, said antenna (At") being aboard a satellite rotating on an earth orbit and senses the energetic flux emitted by at least one zone (SO) on the earth globe (GT) in the hyper-frequency range, wherein all possible combinations of signal pairs (VeA$_i$, VeA$_j$) delivered on the outputs of said coupling probes ($f_{H1}$–$f_{H4}$, $f_{V1}$–$f_{V4}$) horizontal polarization are transmitted, two by two, as entries to electronic receiving circuits, and each of said electronic receiving circuits processes said received signals (VeA$_i$, VeA$_j$), so as to calculate a point of a visibility function of said zone (SO) on the earth globe (GT).

8. A radiometry system according to claim 7, wherein the output signals of said horizontal coupling probes ($f_{H1}$–$f_{H4}$) and the output signals of said vertical coupling probes ($f_{V1}$–$f_{V4}$) are sequentially transmitted, via an electronic switch, (K) to said electronic receiving circuits.

9. A radiometry system according to claim 1, wherein said electromagnetic signals are included in the "L" band and are centered on a 21 cm wavelength.

* * * * *

UNITED STATES PATENT AND TRADEMARK OFFICE
CERTIFICATE OF CORRECTION

PATENT NO. : 6,307,502 B1  Page 1 of 1
DATED : October 23, 2001
INVENTOR(S) : Javier Marti-Canales et al.

It is certified that error appears in the above-identified patent and that said Letters Patent is hereby corrected as shown below:

<u>Drawings,</u>
Sheet 1 of 6, Figure 3, change "$\Phi H3$" to -- $\Phi V3$ --, and change the lines connecting FH1 and FH3 as well as FH2 to FH4, to full lines.

Signed and Sealed this

Sixteenth Day of April, 2002

*Attest:*

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO.    : 6,307,502 B1
DATED         : October 23, 2001
INVENTOR(S)   : Marti-Canales et al.

It is certified that error appears in the above-identified patent and that said Letters Patent is hereby corrected as shown below:

<u>Title page,</u>
Item [73], Assignee, should read: -- [73] Assignee:  Agence Spatiale Europeenne, Paris (FR) --

Signed and Sealed this

Nineteenth Day of August, 2003

JAMES E. ROGAN
*Director of the United States Patent and Trademark Office*